(12) United States Patent
Konno et al.

(10) Patent No.: US 6,653,404 B2
(45) Date of Patent: Nov. 25, 2003

(54) RUBBER COMPOSITIONS

(75) Inventors: Tomohisa Konno, Tokyo (JP);
Toshihiro Tadaki, Tokyo (JP);
Yoshiyuki Udagawa, Tokyo (JP);
Hiroshi Akema, Tokyo (JP)

(73) Assignee: JSR Corporation, Tokyo (JP)

( * ) Notice: Subject to any disclaimer, the term of this patent is extended or adjusted under 35 U.S.C. 154(b) by 176 days.

(21) Appl. No.: 09/843,864

(22) Filed: Apr. 30, 2001

(65) Prior Publication Data

US 2001/0053813 A1 Dec. 20, 2001

(30) Foreign Application Priority Data

May 1, 2000 (JP) ......................................... 2000-132714

(51) Int. Cl.$^7$ ............................................. C08L 51/00
(52) U.S. Cl. ............................. 525/84; 52/524; 52/521; 52/523; 52/525; 52/492; 52/515
(58) Field of Search ................................ 524/515, 521, 524/523, 525, 492; 525/84

(56) References Cited

U.S. PATENT DOCUMENTS

| | | | | |
|---|---|---|---|---|
| 3,929,936 A | * | 12/1975 | Davies et al. | 525/316 |
| 6,027,805 A | * | 2/2000 | Yamanouchi et al. | 428/402.2 |
| 6,093,357 A | * | 7/2000 | Bissonette et al. | 264/248 |
| 6,111,045 A | * | 8/2000 | Takagishi et al. | 526/338 |
| 6,342,559 B1 | * | 1/2002 | Takagishi | 524/492 |

FOREIGN PATENT DOCUMENTS

| | | |
|---|---|---|
| EP | 0 864 927 | 9/1998 |
| EP | 1 046 957 | 10/2000 |
| GB | 1078400 | 8/1967 |
| JP | 3-177444 | 8/1991 |
| JP | 9-208623 | 8/1997 |
| JP | 9-208633 | 8/1997 |
| JP | 10-204217 | 8/1998 |
| JP | 10-204225 | 8/1998 |
| JP | 2001-31798 | 2/2001 |
| WO | WO 96/23027 | 8/1996 |

* cited by examiner

Primary Examiner—David W. Wu
Assistant Examiner—Henry S. Hu
(74) Attorney, Agent, or Firm—Oblon, Spivak, McClelland, Maier & Neustadt, P.C.

(57) ABSTRACT

A rubber composition having satisfactory processability and dimension stability, exhibits excellent tensile strength and wearing resistance when vulcanized and comprises (1) a crosslinked rubber particle containing as repeating units (a) 39.89 to 79.89% by weight of a conjugated diene unit such as 1,3-butadiene or the like, (b) 20 to 60% by weight of an aromatic vinyl unit such as styrene, (c) 0.01 to 10% by weight of a monomer unit having at least two polymerizable unsaturated group such as divinylbenzene, and the like, and (d) 0.1 to 30% by weight of a monomer unit having one polymerizable unsaturated group and an amino group such as vinylbenzylmethylamine, and the like and (2) a conjugated diene/aromatic vinyl copolymeric rubber such as styrene-butadiene copolymeric rubber and the like.

14 Claims, No Drawings

RUBBER COMPOSITIONS

BACKGROUND OF THE INVENTION

1. Field of the Invention

The present invention relates to a rubber composition comprising a crosslinked rubber particle and a conjugated diene/aromatic vinyl copolymeric rubber as essential components. A rubber composition of the invention exhibits an excellent processability, and also exhibits excellent handling performance and dimension stability, and the like especially when combined with a silica as a reinforcing agent. A vulcanized rubber obtained by vulcanizing a rubber composition of the invention has excellent tensile strength and wearing resistance, and the like.

2. Description of the Related Art

A starting rubber employed frequently for a rubber product is a conjugated diene rubber such as a polybutadiene rubber, a polyisoprene rubber, a natural rubber, a styrene-butadiene copolymeric rubber, an acrylonitrile-butadiene copolymeric rubber, and the like.

Any of these starting rubbers, when combined with a silica as a reinforcing agent, can provide a colored rubber product except for a black colored product. However, unlike to a carbon black, a silica may lead to a problematic reduction in the tensile strength and the wearing resistance of a vulcanized rubber, and the like. Additional problems associated with the incorporation of a silica include ① a reduction in the processability and the compound consistency upon kneading, ② an insufficient smoothness of the surface of a sheet made from a compound using a roll and an irregular sheet edge accompanied with a substantial shrinkage upon cooling, and the like.

Such problems may be due to an aggregation of a silica instead of a sufficient dispersion. A rubber composition in which a silica is not dispersed sufficiently poses a difficulty in obtaining a certain reinforcing effect of the incorporation of a reinforcing agent and undergoes a heat generation attributable to the interaction between poorly dispersed silica particles, resulting in a substantial reduction in the processability. Such poor dispersion of a silica occurs possibly because of the reasons that a silica has a high self-interacting effect when compared with a carbon black and tends to aggregate easily and that a starting rubber usually consists of carbon and hydrogen and has a lower polarity when compared with a silica which leads to a low affinity with the silica.

For the purpose of increasing the affinity of a silica with a hydrocarbon-based rubber, the use of a conjugated diene-based rubber to which a functional group having an affinity with the silica is introduced has been investigated. For example, a conjugated diene-based rubber to which a hydroxyl group is introduced (WO96/23027), a conjugated diene-based rubber to which an alkoxysilyl group is introduced (JP-A 9-208623) and a conjugated diene-based rubber to which an alkoxysilyl group and an amino group or a hydroxyl group are introduced (JP-A 9-208633) have been proposed. However, such conjugated diene-based rubber to which a functional group described above is introduced mostly exhibits problematically poor dispersion, excessive heat generation upon processing and poor processability, and the like since it undergoes an extensive aggregation with a silica when the silica is admixed.

On the other hand, a silane coupling agent is incorporated usually for the purpose of preventing an aggregation of a silica and achieving a uniform dispersion. This results in an improvement in the dispersibility of a silica to some extent and a substantial improvement in the processability of a rubber composition and the tensile strength and the wearing resistance of a vulcanized rubber and the like. Nevertheless, the smoothness of the surface and the edge of a sheet or the problematic shrinkage of a sheet upon cooling or the like has not adequately been improved. Furthermore, a sufficient improvement in the processability, the tensile strength or the wearing strength or the like requires the incorporation of a silane coupling agent in an amount as high as about 8 to 15% by weight based on a silica, but such silane coupling agent is expensive and increases the cost for a rubber composition.

SUMMARY OF THE INVENTION

The present invention overcomes the problems experienced conventionally as described above, and is intended to provide a rubber composition having excellent processability and handling performance, which are experienced as a satisfactory processability upon kneading, a smooth sheet surface, a regular sheet edge and a less shrinkage upon cooling, and the like. A vulcanized rubber obtained by vulcanizing a rubber composition described above has excellent tensile strength and wearing resistance, and the like.

We made an effort to solve the problems mentioned above and discovered that by incorporating a crosslinked rubber particle having a certain composition and a conjugated diene/aromatic vinyl copolymeric rubber into a rubber composition it is possible to obtain a rubber composition which exhibits a satisfactory processability upon kneading and which achieves a satisfactory smoothness of the sheet surface and the sheet edge and a less sheet shrinkage upon cooling. It was also discovered that by using this rubber composition it is possible to obtain a vulcanized rubber having sufficient tensile strength and wearing resistance, and the like. In addition, even when a silane coupling agent is used only in a reduced amount or is not used, the processability and the tensile strength, and the like were revealed to be improved sufficiently to the levels at which no practical problems are experienced. Furthermore, it was also revealed that even when a carbon black is incorporated a rubber composition having an excellent processability and a satisfactory dimension stability can be obtained and a vulcanized rubber having an excellent wearing resistance and the like can be obtained.

The present invention is based on the findings described above and can be described as follows.

1. A rubber composition comprising (1) a crosslinked rubber particle containing as repeating units (a) 39.89 to 79.89% by weight of a conjugated diene unit, (b) 20 to 60% by weight of an aromatic vinyl unit, (c) 0.01 to 10% by weight of a monomer unit having at least two polymerizable unsaturated group and (d) 0.1 to 30% by weight of a monomer unit having one polymerizable unsaturated group and an amino group [the total amount of (a), (b), (c) and (d) is 100% by weight], and (2) a conjugated diene/aromatic vinyl copolymeric rubber whose conjugated diene unit has a 1,2-vinyl content of 10 to 30% and a 1,4-trans content exceeding 55%.

2. A rubber composition according to 1 above, further comprising at least one selected from a silica and a carbon black.

3. A rubber composition according to 2 above, wherein the total amount of said silica and said carbon black, when said silica and said carbon black are employed in combination, is 10 to 120 parts by weight based on 100 parts by weight as the total amount of said crosslinked rubber particle and said conjugated diene/aromatic vinyl copolymeric rubber.

4. A rubber composition according to 1 above, wherein at least a part of said conjugated diene/aromatic vinyl copolymeric rubber comprises 0.1 to 30% by weight of a monomer unit having one polymerizable unsaturated group and at least one functional group selected from a carboxylic group ($CO_2H$ and/or $CO_2^-$), an amino group, a hydroxyl group, an epoxy group and an alkoxysilyl group.

5. A rubber composition according to 4 above, further comprising at least one selected from a silica and a carbon black.

6. A rubber composition according to 5 above, wherein the total amount of said silica and said carbon black, when said silica and said carbon black are employed in combination, is 10 to 120 parts by weight based on 100 parts by weight as the total amount of said crosslinked rubber particle and said conjugated diene/aromatic vinyl copolymeric rubber.

7. A rubber composition according to 1 above, wherein said conjugated diene forming said conjugated diene unit (a) and said conjugated diene forming said conjugated diene unit of said conjugated diene/aromatic vinyl copolymeric rubber are each at least one selected from 1,3-butadiene, 2,3-dimethyl-1,3-butadiene, isoprene and chloroprene;

said aromatic vinyl forming said aromatic vinyl unit (b) and said aromatic vinyl forming said aromatic vinyl unit of said conjugated diene/aromatic vinyl copolymeric rubber are each at least one selected from styrene, 2-methylstyrene, 3-methylstyrene, 4-methylstyrene, a-methylstyrene, 2,4-dimethylstyrene, 2,4-diisopropylstyrene, 4-tert-butylstyrene and tert-butoxystyrene;

said monomer forming said monomer unit (c) having at least two polymerizable unsaturated groups is at least one selected from ethylene glycol di(meth)acrylate, propylene glycol di(meth)acrylate, 1,4-butanediol di(meth)acrylate, 1,6-hexanediol di(meth)acrylate, trimethylolpropane di(meth)acrylate, trimethylolpropane tri(meth)acrylate, pentaerythritol tri(meth)acrylate, pentaerythritol tetra(meth)acrylate, divinylbenzene, diisopropenylbenzene and trivinylbenzene; and, said monomer forming said monomer unit (d) having one polymerizable unsaturated group and an amino group is at least one selected from dialkylaminoalkyl (meth)acrylates, N-dialkylaminoalkyl group-containing unsaturated amides and tertiary amino group-containing vinyl aromatic compound.

8. A rubber composition according to 7 above, further comprising at least one selected from a silica and a carbon black.

9. A rubber composition according to 8 above, wherein the total amount of said silica and said carbon black, when said silica and said carbon black are employed in combination, is 10 to 120 parts by weight based on 100 parts by weight as the total amount of said crosslinked rubber particle and said conjugated diene/aromatic vinyl copolymeric rubber.

10. A rubber composition according to 7 above, wherein at least a part of said conjugated diene/aromatic vinyl copolymeric rubber comprises 0.1 to 30% by weight of a monomer unit having one polymerizable unsaturated group and at least one functional group selected from a carboxylic group ($CO_2H$ and/or $CO_2^-$), an amino group, a hydroxyl group, an epoxy group and an alkoxysilyl group.

11. A rubber composition according to 10 above, further comprising at least one selected from a silica and a carbon black.

12. A rubber composition according to 11 above, wherein the total amount of said silica and said carbon black, when said silica and said carbon black are employed in combination, is 10 to 120 parts by weight based on 100 parts by weight as the total amount of said crosslinked rubber particle and said conjugated diene/aromatic vinyl copolymeric rubber.

13. A rubber composition according to 10 above, wherein said monomer forming said monomer unit having one polymerizable unsaturated group and carboxylic group ($CO_2H$ and/or $CO_2^-$) is at least one selected from (meth)acrylic acid, maleic acid, fumaric acid, itaconic acid, tetraconic acid, cinnamic acid; and, a monoester of phthalic acid, succinic acid, adipic acid with a hydroxyl (meth)allyl alcohol and 2-hydroxyethyl (meth)acrylate as well as their salts;

said monomer forming said monomer unit having one polymerizable unsaturated group and an amino group is at least one group selected from dimethylaminomethyl (meth)acrylate, diethylaminomethyl (meth)acrylate, 2-dimethylaminoethyl (meth)acrylate, 2-diethylaminoethyl (meth)acrylate, 2-(di-n-propylamino)ethyl (meth)acrylate, 2-dimethylaminopropyl (meth)acrylate, 2-diethylaminopropyl (meth)acrylate, 2-(di-n-propylamino)propyl (meth)acrylate, 3-dimethylaminopropyl (meth)acrylate, 3-diethylaminopropyl (meth)acrylate, 3-(di-n-propylamino)propyl (meth)acrylate, and N-dimethylaminomethyl (meth)acrylamide, N-diethylaminomethyl (meth)acrylamide, N-(2-dimethylaminoethyl) (meth)acrylamide, N-(2-diethylaminoethyl) (meth)acrylamide, N-(2-diethylaminopropyl) (meth)acrylamide, N-(3-dimethylaminopropyl) (meth)acrylamide, N-(3-diethylaminopropyl) (meth)acrylamide, and N,N-dimethyl-p-aminostyrene, N,N-diethyl-p-aminostyrene, dimethyl(p-vinylbenzyl)amine, diethyl (p-vinylbenzyl)amine, dimethyl(p-vinylphenethyl) amine, diethyl(p-vinylphenethyl)amine, dimethyl(p-vinylbenzyloxy-methyl)amine, dimethyl[2-(p-vinylbenzyloxy)ethyl]amine, diethyl(p-vinylbenzyloxymethyl)amine, diethyl[2-(p-vinylbenzyloxy)ethyl]amine, dimethyl(p-vinylphenethyloxymethyl)amine, dimethyl[2-(p-vinylphenethyloxy)ethyl]amine, diethyl(p-vinylphenethyloxymethyl)amine, diethyl[2-(p-vinylphenethyloxy)ethyl]amine, 2-vinylpyridine, 3-vinylpyridine and 4-vinylpyridine;

said monomer forming said monomer unit having one polymerizable unsaturated group and a hydroxyl group is at least one member selected from 2-hydroxyethyl (meth)acrylates, 2-hydroxypropyl (meth)acrylates, 3-hydroxypropyl (meth)acrylates, 2-hydroxybutyl (meth)acrylates, 3-hydroxybutyl (meth)acrylates and 4-hydroxybutyl (meth)acrylates, mono (meth)acrylates of a polyethylene glycol (the number of ethylene glycol units is 2 to 23), mono (meth)acrylates of polypropylene glycol (the number of propylene glycol units is 2 to 23), and o-hydroxystyrene, m-hydroxystyrene, p-hydroxystyrene, o-hydroxy-α-methylstyrene, m-hydroxy-α-methylstyrene, p-hydroxy-α-methylstyrene p-vinylbenzyl alcohol, and (meth)allyl alcohol;

said monomer forming said monomer unit having one polymerizable unsaturated group and epoxy group is at least one selected from (meth)allylglycidylether, glycidyl (meth)acrylate, and 3,4-oxycyclohexyl (meth)acrylate; and, said monomer forming said monomer unit having one polymerizable unsaturated group and alkoxysilyl group is at least one selected from (meth)acryloxymethyl trimethoxysilane, (meth)acryloxymethyl methyldimethoxysilane, (meth)acryloxymethyl dimethylmethoxysilane, (meth)acryloxymethyl triethoxysilane, (meth)acryloxymethyl methyldiethoxysilane, (meth) acryloxymethyl dimethylethoxysilane, (meth)acryloxymethyl tripropoxysilane, (meth)acryloxymethyl methyldipropoxysilane, (meth)acryloxymethyl dimethylpropoxysilane, γ-(meth)acryloxypropyl trimethoxysilane, γ-(meth)acryloxypropyl methyldimethoxysilane, γ-(meth)acryloxypropyl dimethylmehtoxysilane, γ-(meth)acryloxypropyl triethoxysilane, γ-(meth)acryloxypropyl methyldiethoxysilane, γ-(meth)acryloxypropyl dimethylethoxysilane, γ-(meth)acryloxypropyl tripropoxysilane, γ-(meth)acryloxypropyl methyldipropoxysilane, γ-(meth)acryloxypropyl dimethylpropoxysilane, γ-(meth)acryloxypropyl methyldiphenoxysilane, γ-(meth)acryloxypropyl dimethylphenoxysilane, γ-(meth)acryloxypropyl methyldibenzyloxysilane, and γ-(meth)acryloxypropyl dimethylphenoxysilane.

14. A rubber composition according to 7 above, which said crosslinked rubber particle additionally contains another polymerizable unsaturated monomer unit wherein a monomer forming said polymerizable unsaturated monomer unit is at least one selected from (meth)acrylonitrile, vinylidene cyanide, vinyl chloride, vinylidene chloride, (meth) acrylamide, maleimide, methyl (meth)acrylate, ethyl (meth) acrylate, n-propyl (meth)acrylate, iso-propyl (meth)acrylate, n-butyl (meth)acrylate, iso-butyl (meth)acrylate, sec-butyl (meth)acrylate, tert-butyl (meth)acrylate, n-amyl (meth) acrylate, n-hexyl (meth)acrylate, 2-ethylhexyl (meth) acrylate and cyclohexyl (meth) acrylate.

15. A rubber composition according to 14 above, further comprising at least one selected from a silica and a carbon black.

16. A rubber composition according to 15 above, wherein the total amount of said silica and said carbon black, when said silica and said carbon black are employed in combination, is 10 to 120 parts by weight based on 100 parts by weight as the total amount of said crosslinked rubber particle and said conjugated diene/aromatic vinyl copolymeric rubber.

17. A rubber composition according to 14 above, wherein at least a part of said conjugated diene/aromatic vinyl copolymeric rubber comprises 0.1 to 30% by weight of a monomer unit having one polymerizable unsaturated group and at least one functional group selected from a carboxylic group ($CO_2H$ and/or $CO_2^-$), an amino group, a hydroxyl group, an epoxy group and an alkoxysilyl group.

18. A rubber composition according to 17 above, further comprising at least one selected from a silica and a carbon black.

19. A rubber composition according to 18 above, wherein the total amount of said silica and said carbon black, when said silica and said carbon black are employed in combination, is 10 to 120 parts by weight based on 100 parts by weight as the total amount of said crosslinked rubber particle and said conjugated diene/aromatic vinyl copolymeric rubber.

20. A rubber composition according to 19 above, wherein said monomer forming said monomer unit having one polymerizable unsaturated group and carboxylic group ($CO_2H$ and/or $CO_2^-$) is at least one selected from (meth)acrylic acid, maleic acid, fumaric acid, itaconic acid, tetraconic acid, cinnamic acid; and, a monoester of phthalic acid, succinic acid, adipic acid with a hydroxyl (meth)allyl alcohol and 2-hydroxyethyl (meth)acrylate as well as their salts;

said monomer forming said monomer unit having one polymerizable unsaturated group and an amino group is at least one member selected from dimethylaminomethyl (meth)acrylate, diethylaminomethyl (meth) acrylate, 2-dimethylaminoethyl (meth)acrylate, 2-diethylaminoethyl (meth)acrylate, 2-(di-propylamino)ethyl (meth)acrylate, 2-dimethylaminopropyl (meth)acrylate, 2-diethylaminopropyl (meth)acrylate, 2-(di-n-propylamino)propyl (meth)acrylate, 3-dimethylaminopropyl(meth)acrylate, 3-diethylaminopropyl (meth)acrylate, 3-(di-propylamino)propyl (meth)acrylate, and N-dimethylaminomethyl (meth)acrylamide, N-diethylaminomethyl (meth)acrylamide, N-(2-dimethylaminoethyl) (meth)acrylamide, N-(2-diethylaminoethyl) (meth)acrylamide, N-(2-dimethylaminopropyl) (meth)acrylamide, N-(2-diethylaminopropyl) (meth)acrylamide, N-(3-dimethylaminopropyl) (meth)acrylamide, N-(3-diethylaminopropyl) (meth)acrylamide, and N,N-dimethyl-p-aminostyrene, N,N-diethyl-p-aminostyrene, dimethyl(p-vinylbenzyl)amine, diethyl (p-vinylbenzyl)amine, dimethyl(p-vinylphenethyl) amine, diethyl(p-vinylphenethyl)amine, dimethyl(p-vinylbenzyloxymethyl)amine, dimethyl[2-(p-vinylbenzyloxy)ethyl]amine, diethyl(p-vinylbenzyloxymethyl)amine, diethyl[2-(p-vinylbenzyloxy)ethyl]amine, dimethyl(p-vinylphenethyloxymethyl)amine, dimethyl[2-(p-vinylphenethyloxy)ethyl]amine, diethyl(p-vinylphenethyloxymethyl)amine, diethyl[2-(p-vinylphenethyloxy)ethyl]amine, 2-vinylpyridine, 3-vinylpyridine and 4-vinylpyridine;

said monomer forming said monomer unit having one polymerizable unsaturated group and hydroxyl group is at least one selected from 2-hydroxyethyl (meth) acrylates, 2-hydroxypropyl (meth)acrylates, 3-hydroxypropyl (meth)acrylates, 2-hydroxybutyl (meth)acrylates, 3-hydroxybutyl (meth)acrylates and 4-hydroxybutyl (meth)acrylates, mono (meth)acrylates of apolyethylene glycol (the number of ethylene glycol units is 2 to 23), mono (meth)acrylates of polypropylene glycol (the number of propylene glycol units is 2 to 23), and N-hydroxymethyl (meth)acrylamide, N-(2-hydroxyethyl) (meth)acrylamide, N,N-bis(2-hydroxyethyl) (meth) acrylamide, and o-hydroxystyrene, m-hydroxystyrene, p-hydroxystyrene, o-hydroxy-α-methylstyrene, m-hydroxy-α-methylstyrene, p-hydroxy-α-methylstyrene p-vinylbenzyl alcohol, and (meth)allyl alcohol;

said monomer forming said monomer unit having one polymerizable unsaturated group and epoxy group is at least one selected from (meth)allylglycidylether, glycidyl (meth)acrylate, and 3,4-oxycyclohexyl (meth) acrylate; and, said monomer forming said monomer unit having one polymerizable unsaturated group and alkoxysilyl group is at least one selected from (meth)acryloxymethyl trimethoxysilane, (meth)acryloxymethyl methyldimethoxysilane, (meth)acryloxymethyl dimethylmethoxysilane, (meth)acryloxymethyl triethoxysilane, (meth)acryloxymethyl methyldiethoxysilane, (meth)acryloxymethyl dimethylethoxysilane, (meth)acryloxymethyl tripropoxysilane, (meth)acryloxymethyl methyldipropoxysilane, (meth)acryloxymethyl dimethylpropoxysilane, γ-(meth)acryloxypropyl trimethoxysilane, γ-(meth)acryloxypropyl methyldimethoxysilane, γ-(meth)acryloxypropyl dimethylmehtoxysilane, γ-(meth)acryloxypropyl triethoxysilane, γ-(meth)acryloxypropyl methyldiethoxysilane, γ-(meth)acryloxypropyl dimethylethoxysilane, γ-(meth)acryloxypropyl tripropoxysilane, γ-(meth)acryloxypropyl methyldipropoxysilane, γ-(meth)acryloxypropyl dimethylpropoxysilane, γ-(meth)acryloxypropyl methyldiphenoxysilane, γ-(meth)acryloxypropyl dimethylphenoxysilane, γ-(meth)acryloxypropyl methyldibenzyloxysilane, and γ-(meth)acryloxypropyl dimethylphenoxysilane.

According to the invention, a rubber composition having a satisfactory processability and the like can particularly be obtained even when a silica is incorporated as a reinforcing agent. Such rubber composition can be converted into a vulcanized rubber having excellent tensile strength and wearing resistance, and the like, and is useful as a material for an industrial product such as a rubber roll, a grinding roll, a belt, a hose, a sponge, a rubber board and a rubber-coated fabric, and the like, a shoe part for example of a transparent shoe, an ordinary colored shoe and a sponge-soled shoe, and the like, a tire of a large-sized or small sized car such as a tread, a base tread, a side wall and a rubber chaser, and the like and a sanitary material such as a contraceptive rubber and a health care product.

DETAILED DESCRIPTION OF THE INVENTION

A rubber composition of the invention comprises (1) a crosslinked rubber particle containing as repeating units (a) 39.89 to 79.89% by weight of a conjugated diene unit, (b) 20 to 60% by weight of an aromatic vinyl unit, (c) 0.01 to 10% by weight of a monomer unit having at least two polymerizable unsaturated group and (d) 0.1 to 30% by weight of a monomer unit having one polymerizable unsaturated group and an amino group [the total amount of (a), (b), (c) and (d) is 100% by weight], and (2) a conjugated diene/aromatic vinyl copolymeric rubber whose conjugated diene unit has a 1,2-vinyl content of 10 to 30% and a 1,4-trans content exceeding 55%.

A "crosslinked rubber particle" described above consists of (a) a monomer which forms a conjugated diene unit (hereinafter referred to as "Monomer ①"), (b) a monomer unit which forms an aromatic vinyl unit (hereinafter referred to as "Monomer ②"), (c) a monomer which forms a monomer unit having at least two polymerizable unsaturated group (hereinafter referred to as "Monomer ③") and (d) a monomer which forms a monomer unit having one polymerizable unsaturated group and an amino group (hereinafter referred to as "Monomer ④"). Another polymerisable unsaturated monomer described below (hereinafter referred to as "Monomer ⑤") can also be employed in combination.

A crosslinked rubber particle described above is a particle whose toluene-insolubles based on the solid of the filtrate obtained by a filtration through a 100 mesh-sized wire mesh after immersing in 100 ml of toluene at room temperature for 24 hours is 80% by weight or more and whose particle size determined using a laser particle size analysis system (OTSUKA DENSHI Co., Ltd., Model LPA-3100) is 500 nm or less.

A crosslinked rubber particle can be produced using Monomers ① to ④ optionally with Monomer ⑤ by an emulsion polymerization, a suspension polymerization, and the like.

Monomer ① may for example be 1,3-butadiene, 2,3-dimethyl-1,3-butadiene, isoprene and chloroprene, and the like. Any of these Monomers ① may be used alone or in combination of two or more.

In a repeating unit of a crosslinked rubber particle, the unit of Monomer ① is present in an amount of 39.89 to 79.89% by weight, particularly 40 to 70% by weight. An amount of Monomer ① less than the lower limit specified above leads to a difficulty in improving the processability, resulting in a reduced tensile strength of a vulcanized rubber.

Monomer ② may for example be styrene, 2-methylstyrene, 3-methylstyrene, 4-methylstyrene, α-methylstyrene, 2,4-dimethylstyrene, 2,4-diisopropylstyrene, 4-tert-butylstyrene and tert-butoxystyrene, and the like. Any of these Monomers ② may be used alone or in combination of two or more.

In a repeating unit of a crosslinked rubber particle, the unit of Monomer ② is present in an amount of 20 to 60% by weight, particularly 20 to 50% by weight. An amount of Monomer ② less than 20% by weight leads to a reduced wearing resistance or the like of a vulcanized rubber. On the other hand, an amount exceeding 60% by weight leads to a reduced processability.

Monomer ③ may for example be ethylene glycol di(meth)acrylate, propylene glycol di(meth)acrylate, 1,4-butanediol di(meth)acrylate, 1,6-hexanediol di(meth)acrylate, trimethylolpropane di(meth)acrylate, trimethylolpropane tri(meth)acrylate, pentaerythritol tri(meth)acrylate, pentaerythritol tetra(meth)acrylate, divinylbenzene, diisopropenylbenzene and trivinylbenzene, and the like. Any of these Monomers ③ may be used alone or in combination of two or more.

In a repeating unit of a crosslinked rubber particle, the unit of Monomer ③ is present in an amount of 0.01 to 10% by weight, particularly 0.1 to 10% by weight. An amount of Monomer ③ less than 0.01% by weight leads to a reduced processability of a rubber composition. On the other hand, an amount exceeding 10% by weight leads to a reduced processability as well as a reduced tensile strength of a vulcanized rubber.

Monomer ④ is preferably a monomer having a tertiary amino group and may for example be those listed below: (a) Dialkylaminoalkyl (meth)acrylates such as dimethylaminomethyl (meth)acrylate, diethylaminomethyl (meth)acrylate, 2-dimethylaminoethyl (meth)acrylate, 2-diethylaminoethyl (meth)acrylate, 2-(di-n-propylamino)ethyl (meth)acrylate, 2-dimethylaminopropyl(meth)acrylate, 2-diethylaminopropyl (meth)acrylate, 2-(di-propylamino)propyl (meth)acrylate, 3-dimethylaminopropyl (meth)acrylate, 3-diethylaminopropyl (meth)acrylate and 3-(di-n-propylamino)propyl (meth)acrylate, and the like, (b) N-dialkylaminoalkyl group-containing unsaturated amides such as N-dimethylaminomethyl (meth)acrylamide, N-diethylaminomethyl (meth)acrylamide, N-(2-dimethylaminoethyl) (meth)acrylamide, N-(2-diethylaminoethyl) (meth)acrylamide, N-(2-diethylaminopropyl) (meth)acrylamide, N-(3- dimethylaminopropyl) (meth)acrylamide and N-(3-diethylaminopropyl) (meth)acrylamide, (c) tertiary amino group-containing vinyl aromatic compound, such as N,N-dimethyl-p-aminostyrene, N,N-diethyl-p-aminostyrene, dimethyl(p-vinylbenzyl)amine, diethyl(p-vinylbenzyl) amine, dimethyl(p-vinylphenethyl)amine, diethyl(p-vinylphenethyl)amine, dimethyl(p-vinylbenzyloxymethyl) amine, dimethyl[2-(p-vinylbenzyloxy)ethyl]amine, diethyl (p-vinylbenzyloxymethyl)amine, diethyl[2-(p-vinylbenzyloxy)ethyl]amine, dimethyl(p-vinylphenethyloxymethyl)amine, dimethyl[2-(p-vinylphenethyloxy)ethyl]amine, diethyl(p-vinylphenethyloxymethyl)amine, diethyl[2-(p-vinylphenethyloxy)ethyl]amine, 2-vinylpyridine, 3-vinylpyridine and 4-vinylpyridine, and the like.

Among these listed above, a dialkylaminoalkyl (meth) acrylate and a tertiary amino group-containing vinyl aromatic compound are preferred. Any of these amino group-containing monomers may be employed alone or in combination of two or more.

In a repeating unit of a crosslinked rubber particle, the unit of Monomer ④ is present in an amount of 0.1 to 30% by weight, particularly 0.3 to 15% by weight. An amount of Monomer ④ less than 0.1% by weight leads to an insufficient affinity of the crosslinked rubber particle with a silica, resulting in a reduced processability of the rubber composition. On the other hand, an amount exceeding 30% by weight leads to a strong aggregation between the crosslinked rubber particle and a silica or a carbon black, resulting in a reduced processability.

Monomer ⑤ is not limited to a particular type as long as it is a compound having one copolymerizable unsaturated group. Such Monomer ⑤ may for example be (meth) acrylonitrile, vinylidene cyanide, vinyl chloride, vinylidene chloride, (meth)acrylamide, maleimide, methyl (meth) acrylate, ethyl (meth)acrylate, n-propyl (meth)acrylate, iso-propyl (meth)acrylate, n-butyl (meth)acrylate, iso-butyl (meth)acrylate, sec-butyl (meth)acrylate, tert-butyl (meth) acrylate, n-amyl (meth)acrylate, n-hexyl (meth)acrylate, 2-ethylhexyl (meth)acrylate and cyclohexyl (meth)acrylate, and the like. Any of these Monomers ⑤ may be employed alone or in combination of two or more.

The amount of Monomer ⑤, when employed, based on 100 parts by weight (hereinafter abbreviated as "parts") as the total of Monomers ①, ②, ③, and ④ is 0.1 to 5 parts, especially 0.5 to 3 parts.

While a crosslinked rubber particle can be produced using a radical initiator by an emulsion or suspension polymerization, it is produced preferably by an emulsion polymerization in view of the uniformity in the particle size.

A radical initiator can be an organic peroxide such as benzoyl peroxide, lauroyl peroxide, tert-butyl hydroperoxide, cumene hydroperoxide, p-menthane hydroperoxide, di-tert-butyl peroxide and dicumyl peroxide, and the like. In addition, an azo compound such as azobisisobutyronitrile, an inorganic peroxide such as potassium persulfate, and a redox catalyst and the like such as a combination of any of these peroxides with ferrous sulfate may also be employed. Any of these radical initiators may be employed alone or in combination of two or more, and a combination of different types may also be used.

A chain transfer agent such as mercaptans including tert-dodecylmercaptane and n-dodecylmercaptane, and the like, carbon tetrachloride, thioglycols, diterpene, terpinolene and γ-terpinene and the like may also be used in combination.

An emulsifier employed in an emulsion polymerization may for example be an anionic surfactant, a nonionic surfactant, a cationic surfactant as well as an amphoteric surfactant and the like. A fluorine-based surfactant may also be employed. Any of these emulsifier may be employed alone or in combination of two or more, and a combination of different types may also be used.

A suspension stabilizer employed in a suspension polymerization may for example be polyvinyl alcohol, sodium polyacrylate and hydroxyethyl cellulose, and the like. Any of these suspension stabilizers may be employed alone or in combination of two or more.

In an emulsion or suspension polymerization, each monomer and a radical initiator, and the like may be added all at once prior to the initiation of the polymerization, or they may be added continuously or intermittently over the period of the reaction. The polymerization may be effected in an oxygen-free reactor at 0 to 80° C. with changing temperature or stirring condition or the like as desired during the reaction. The polymerization may be of a continuous system or a batch system.

In a "conjugated diene/aromatic vinyl copolymeric rubber" described above, a conjugated diene which forms a conjugated diene unit may be any of those described above, and an aromatic vinyl which forms an aromatic vinyl unit may also be any of those described above. Such conjugated diene/aromatic vinyl copolymeric rubber may for example be a styrene-butadiene copolymeric rubber and the like. In this conjugated diene/aromatic vinyl copolymeric rubber, the 1,2-vinyl content of the conjugated diene unit is 10 to 30% and the 1,4-trans content exceeds 55%. A 1,2-vinyl content exceeding 30% results in a reduced wearing resistance of a vulcanized rubber and the like. A conjugated diene/aromatic vinyl copolymeric rubber into which at least one functional group selected from a carboxylic group, an amino group, a hydroxyl group, an epoxy group and an alkoxysilyl group may also be employed. This results in an elevated affinity of a silica with the conjugated diene/aromatic vinyl copolymeric rubber. The aromatic vinyl unit in a conjugated diene/aromatic vinyl copolymeric rubber is present preferably in an amount of 20 to 50% by weight.

This conjugated diene/aromatic vinyl copolymeric rubber is a rubber whose toluene-insolubles based on the solid of the filtrate obtained by a filtration through a 100 mesh-sized wire mesh after immersing in 100 ml of toluene at room temperature for 24 hours is 30% by weight or less, whose weight-average molecular weight (Mw) represented as polystyrene determined by a GPC (gel permeation chromatography) is 100000 to 2000000, and which contains as repeating units a conjugated diene unit and an aromatic vinyl unit.

A conjugated diene/aromatic vinyl copolymeric rubber can be produced by subjecting Monomer ① and Monomer ② used in forming a crosslinked rubber particle to an emulsion or suspension polymerization optionally with Monomer ⑤. A conjugated diene/aromatic vinyl copolymeric rubber into which a functional group is introduced can be produced by subjecting Monomer ① and Monomer ② used in forming a crosslinked rubber particle and a monomer which forms a monomer unit having one polymerizable unsaturated group and at least one functional group selected from a carboxylic group, an amino group, a hydroxyl group, an epoxy group and an alkoxysilyl group (hereinafter referred to as "Monomer ⑥") to an emulsion or suspension polymerization optionally with Monomer ⑤. While the polymerization method employed here is not particularly limited, an emulsion polymerization is preferred usually.

A carboxylic group-containing monomer as Monomer ⑥ may for example be:
(a) unsaturated carboxylic acids such as (meth)acrylic acid, maleic acid, fumaric acid, itaconic acid, tetraconic acid and cinnamic acid; and,
(b) free carboxylic acid group-containing esters such as a monoester of a non-polymerizable multivalent carboxylic acid such as phthalic acid, succinic acid and adipic acid with a hydroxyl group-containing unsaturated compound such as (meth)allyl alcohol and 2-hydroxyethyl(meth)acrylate as well as their salts.

Among those listed above, an unsaturated combination of two or more.

A hydroxyl group-containing monomer may for example be:
(a) hydroxyalkyl (meth)acrylates such as 2-hydroxyethyl (meth)acrylates, 2-hydroxypropyl (meth)acrylates, 3-hydroxypropyl (meth)acrylates, 2-hydroxybutyl (meth)acrylates, 3-hydroxybutyl (meth)acrylates and 4-hydroxybutyl (meth)acrylates, and the like
(b) mono (meth)acrylates of a polyalkylene glycol (the number of alkylene glycol units is for example 2 to 23) such as polyethylene glycol, polypropylene glycol, and the like.
(c) hydroxy group-containing unsaturated amides such as N-hydroxymethyl (meth)acrylamide, N-(2-hydroxyethyl) (meth)acrylamide and N,N-bis(2-hydroxyethyl) (meth) acrylamide, and the like
(d) hydroxy group-containing vinyl aromatic compounds such as o-hydroxystyrene, m-hydroxystyrene, p-hydroxystyrene, o-hydroxy-α-methylstyrene, m-hydroxy-α-methylstyrene, p-hydroxy-α-methylstyrene and p-vinylbenzyl alcohol, and the like,
(e) (meth)allyl alcohol and the like.

Among those listed above, hydroxyalkyl (meth)acrylates and hydroxyl group-containing vinyl aromatic compounds are preferred. Any of the hydroxyl group-containing monomers may be employed alone or in combination of two or more.

An epoxy group-containing monomer may for example be (meth)allylglycidylether, glycidyl (meth)acrylate and 3,4-oxycyclohexyl (meth)acrylate, and the like. Any of these epoxy group-containing monomers may be employed alone or in combination of two or more.

An alkoxysilyl group-containing monomer may for example be:
(meth)acryloxymethyl trimethoxysilane, (meth)acryloxymethyl methyldimethoxysilane, (meth)acryloxymethyl dimethylmethoxysilane, (meth)acryloxymethyl triethoxysilane, (meth)acryloxymethyl methyldiethoxysilane, (meth)acryloxymethyl dimethylethoxysilane, (meth)acryloxymethyl tripropoxysilane, (meth)acryloxymethyl methyldipropoxysilane, (meth)acryloxymethyl dimethylpropoxysilane, (meth)acryloxypropyl trimethoxysilane, (meth)acryloxypropyl methyldimethoxysilane, (meth)acryloxypropyl dimethylmehtoxysilane, γ-(meth)acryloxypropyl triethoxysilane, γ-(meth)acryloxypropyl methyldiethoxysilane, γ-(meth)acryloxypropyl dimethylethoxysilane, γ-(meth)acryloxypropyl tripropoxysilane, γ-(meth)acryloxypropyl methyldipropoxysilane, γ-(meth)acryloxypropyl dimethylpropoxysilane, γ-(meth)acryloxypropyl methyldiphenoxysilane, γ-(meth)acryloxypropyl dimethylphenoxysilane, γ-(meth)acryloxypropyl methyldibenzyloxysilane and γ-(meth)acryloxypropyl dimethylphenoxysilane. Any of these alkoxysilyl group-containing monomers may be employed alone or in combination of two or more.

Among those listed as Monomer ⑥, an amino group-containing monomer may be one similar to Monomer ④ employed in the polymerization of a crosslinked rubber particle.

Monomer ⑥ can be selected and used as desired. Two or more of the monomers having a carboxylic group, an amino group, a hydroxyl group, an epoxy group and an alkoxysilyl group may be employed in combination. For example, a carboxyl group-containing monomer and a hydroxyl group-containing monomer can be used in combination.

The amount of the unit consisting of Monomer ① in a conjugated diene/aromatic vinyl copolymeric rubber with or without any introduced functional group is preferably 50 to 80% by weight, particularly 55 to 80% by weight. The amount of the unit consisting of Monomer ② is preferably 20 to 50% by weight, particularly 20 to 45% by weight. An amount of the unit consisting of Monomer ② less than 20% by weight may lead to a reduced wearing resistance of a vulcanized rubber and the like. On the other hand, an amount exceeding 50% by weight tends to result in a poor elasticity of a vulcanized rubber. The amount of the unit consisting of Monomer ⑥ in a conjugated diene/aromatic vinyl copolymeric rubber into which a functional group is introduced is preferably 0.1 to 30% by weight, and an amount exceeding the upper limit specified here is not preferred since it leads to a strong aggregation between the conjugated diene/aromatic vinyl copolymeric rubber and a silica or a carbon black, resulting in a reduced processability.

A rubber composition of the invention preferably contains, based on 100 parts by weight (hereinafter abbreviated as parts) of the entire rubber components contained in this rubber composition, 1 to 70 parts of a crosslinked rubber particle component and 30 to 99 parts of a non-crosslinked rubber component. An amount of the crosslinked rubber particle less than 1 part leads to a lower processability-improving effect, while one exceeding 70 parts leads to a problematically reduced physical property of a vulcanized rubber.

A rubber composition of the invention, when used practically, may usually be supplemented with a reinforcing agent. The reinforcing agent is not particularly limited, and such reinforcing agent may be a silica and/or a carbon black mentioned above especially.

A silica may be one used generally as a white reinforcing agent. While the type of a silica is not particularly limited, a wet process type white carbon, a dry process type white carbon, a colloidal silica and a precipitated silica, and the like described in Japanese Patent laid-open publication 62-62838 can be employed. Among those listed above, a wet process type white carbon whose main component is silicic hydrate is preferred particularly. Any of these silica-based compound may be employed alone or in combination of two or more. While the specific surface area of the silica is not particularly limited, a nitrogen absorption specific surface area (area determined by BET method in accordance with ASTM D3037-81) is usually 50 to 400 $m^2/g$, preferably 50 to 220 $m^2/g$, more preferably 70 to 220 $m^2/g$, for the purpose of achieving a sufficient improvement in the reinforcing performance, the wearing resistance and the exothermic behavior, and the like.

The amount of the silica when employed alone based on 100 parts as the total amount of a crosslinked rubber particle and a conjugated diene/aromatic vinyl copolymeric rubber is 2 to 120 parts, preferably 10 to 100 parts, more preferably 30 to 100 parts. An amount of the silica less than 2 parts may leads to a problematically insufficient reinforcing effect. On the other hand, an amount of 120 parts is enough for obtaining a sufficient reinforcing effect, and no further amount is required.

While the type of a carbon black or the like is not particularly limited, those which may be employed are a furnace black, an acetylene black, a thermal black, a channel black, a graphite, and the like. Among those listed above, a furnace black is preferred including SAF, ISAF, ISAF-HS, ISAF-LS, IISAF-HS, HAF, HAF-HS, HAF-LS, FEF, and the like. Any of these carbon blacks may be employed alone or in combination of two or more.

While the nitrogen absorption specific surface area of a carbon black determined similarly to a silica is not particularly limited, it is usually 5 to 200 $m^2/g$, preferably 50 to 150 $m^2/g$, more preferably 80 to 130 $m^2/g$, for the purpose of achieving a sufficient improvement in the tensile strength and the wearing resistance of a vulcanized rubber and the like. While the DBP absorption level of the carbon black is not particularly limited as well, it is 5 to 300 ml/100 g, preferably 50 to 200 ml/100 g, more preferably 80 to 160 ml/100 g, for the purpose of a sufficient improvement in the tensile strength and the wearing resistance, and the like. A further improvement in the wearing resistance can be achieved by using as a carbon black a high structure carbon black described in Japanese Patent laid-open publication 5-230290, whose cetyltrimethylammonium bromide absorption specific surface area is 110 to 170 $m^2/g$ and whose DBP (24M4DBP) oil absorption level after compressing under 165 MPa four times repetitively is 110 to 130 ml/100 g.

The amount of a carbon black when employed alone based on 100 parts as the total of a crosslinked rubber particle and a conjugated diene/aromatic vinyl copolymeric rubber is 2 to 200 parts, preferably 10 to 100 parts, more preferably 30 to 100 parts. An amount of the carbon black less than 2 parts leads to an insufficient reinforcing effect, resulting in a problematically reduced tensile strength and the like. On the other hand, an amount of 200 parts is enough for obtaining a sufficient reinforcing effect, and no further amount is required.

When a silica and a carbon black are employed in combination, their total amount is preferably 10 to 120 parts, more preferably 50 to 100 parts based on 100 parts as the total of a crosslinked rubber particle and a conjugated diene/aromatic vinyl copolymeric rubber. A total amount less that 10 parts may lead to a problematically insufficient reinforcing effect. On the other hand, an amount of 120 parts is enough for obtaining a sufficient reinforcing effect, and no further amount is required. While the weight ratio of a silica and a carbon black is not particularly limited, 100 parts of the silica is combined preferably with 5 to 200 parts, especially 10 to 150 parts of the carbon black. Within the range of the weight ratio specified above, a vulcanized rubber having an excellent tensile strength and the like can be obtained.

A carbon-silica dual-phase filler as a reinforcing agent may also be added.

A rubber composition of the invention can be supplemented with various components shown below in addition to a reinforcing agent described above.

A clay, calcium carbonate and/or magnesium carbonate, and the like as a filler, each in an appropriate amount, may also be added. A petroleum-based formulated oil such as an aromatic process oil, a naphthene-based process oil and a paraffin-based process oil, and the like may also be added as a rubber extending oil. Such extending oil is preferably an aromatic or naphthene-based process oil.

In addition, aldehyde ammonia-based, guanidine-based, thiourea-based, thiazol-based and dithiocarbamic-based vulcanization promoters, and the like can be used, each in an amount preferably of 0.5 to 15 parts, particularly 1 to 10 parts based on 100 parts as a total of a crosslinked rubber particle and a conjugated diene/aromatic vinyl copolymeric rubber. While a sulfur is a representative valcanizing agent, other materials such as sulfur-containing compounds and peroxides, and the like may also be used. Such vulcanizing agent is added in an amount usually of 0.5 to 10 parts, preferably of 1 to 6 parts based on 100 parts as a total of a crosslinked rubber particle and a conjugated diene/aromatic vinyl copolymeric rubber.

Furthermore, a silane coupling agent, a zinc oxide powder, a vulcanizing aid, an anti-aging agent and a processing aid, and the like may also be added each in an appropriate amount.

A rubber composition of the invention and a rubber product made therefrom can be produced as described below.

First, a crosslinked rubber particle, a conjugated diene/aromatic vinyl copolymeric rubber, a reinforcing agent such as a silica, a carbon black and a carbon-silica dual-phase filler, and the like, a rubber extending oil and other auxiliary components, and the like are kneaded using a kneader such as Banbury mixer or the like at a temperature of 70 to 180° C. Subsequently, the kneaded mixture is cooled and combined with a vulcanizing agent and a vulcanization promoter, and the like such as a sulfur using Banbury mixer or a mixing roll or the like to mold into a desired shape. A vulcanization at a temperature of 140 to 180° C. is then effected to obtain a desired vulcanized rubber, i.e., a rubber product.

A vulcanized rubber obtained by using a rubber composition of the invention as described above has excellent tensile strength and repelling elasticity, and the like. Furthermore, a satisfactory processability is also associated, and such excellent property makes this rubber composition useful as a rubber product in various industrial fields. For example, it can be used as a material for an industrial product such as a rubber roll, a grinding roll, a belt, a hose, a sponge, a rubber board and a rubber-coated fabric, and the like, a shoe part for example of a transparent shoe, an ordinary colored shoe and a sponge-soled shoe, and the like, a tire of a large-sized or small-sized car such as a tread, a base tread, a side wall and a rubber chaser, and the like, and a sanitary material such as a contraceptive rubber and a health care product, and the like.

DESCRIPTION OF THE PREFERRED EMBODIMENTS

The present invention is further described in the following Examples.

(1) Crosslinked Rubber Particle Production

A polymerization reactor was charged with 200 parts of water, 4.5 parts of rosin acid soap and a monomer having each composition shown in Table 1 (in which the unit is "part"). Subsequently, the temperature of the polymerization reactor was set at 5° C., and 0.1 parts of p-menthane hydroperoxide as a radical initiator, 0.07 parts of sodium ethylenediamine tetracetate, 0.05 parts of ferrous sulfate heptahydrate and 0.15 parts of sodium formaldehyde sulfoxylate were added and the polymerization was continued for 12 hours to obtain an emulsion containing a crosslinked rubber particle. The polymerization conversion rate was about 100%.

Subsequently, this emulsion was combined with 37.5 parts of an aroma oil based on 100 parts of the crosslinked rubber particle, was coagulated using sulfuric acid and a salt to form a crumb, which was then dried using a hot blast drier to obtain each of the crosslinked rubber particles 1 to 4 having the monomer compositions shown in Table 1.

TABLE 1

| Crosslinked rubber particle | 1 | 2 | 3 | 4 |
|---|---|---|---|---|
| Raw Material | | | | |
| Butadiene | 58 | 54 | 58 | 58 |
| Styrene | 35 | 35 | 35 | 35 |
| Divinylbenzene | 2 | 1 | 2 | 2 |
| Diethylaminoethyl methacrylate | 5 | 10 | | |
| Vinylbenzyldimethylamine | | | 5 | |
| 4-Vinylpyridine | | | | 5 |

(2) Conjugated Diene/Aromatic Vinyl Copolymeric Rubber Production

A polymerization reactor was charged with 200 parts of water, 4.5 parts of rosin acid soap and a monomer having each composition shown in Table 2 (in which the unit is "part"). Subsequently, the temperature of the polymerization reactor was set at 5° C., and 0.1 parts of p-menthane hydroperoxide as a radical initiator, 0.07 parts of sodium ethylenediamine tetracetate, 0.05 parts of ferrous sulfate heptahydrate and 0.15 parts of sodium formaldehyde sulfoxylate were added and the polymerization was initiated. When the polymerization conversion rate reached 60%, diethylhydroxylamine was added to terminate the polymerization, and an unreacted monomer was recovered by a steam stripping to obtain an emulsion containing a conjugated diene/aromatic vinyl copolymeric rubber.

Subsequently, this emulsion was combined with 37.5 parts of an aroma oil based on 100 parts of the conjugated diene/aromatic vinyl copolymeric rubber, was coagulated using sulfuric acid and a salt to form a crumb, which was then dried using a hot blast drier to obtain each of the conjugated diene/aromatic vinyl copolymeric rubbers 1 to 8 having the monomer compositions shown in Table 2.

The content of each monomer shown in Table 2 and the weight-average molecular weight of each conjugated diene/aromatic vinyl copolymeric rubber were determined by the following methods.

(a) Styrene content (% by weight); A calibration curve made by an infrared absorption spectroscopy was employed.

(b) 1,2-vinyl content and 1,4-trans content of butadiene unit (% by weight); An infrared absorption spectroscopy (*MORELLO* method) was employed.

(c) Carboxyl group-containing monomer content (% by weight); A rubber was dissolved in toluene and re-precipitated from methanol, and this procedure was repeated twice to purify the rubber, which was then dried in vacuum, dissolved in chloroform, and then titrated until being neutralized.

(d) Amino group-containing monomer content (% by weight); A rubber was dissolved in toluene and re-precipitated from methanol, and this procedure was repeated twice to purify the rubber, which was then dried in vacuum, subjected to an elemental analysis to obtain a nitrogen content, from which the content was calculated.

(e) Hydroxyl group-containing monomer content (% by weight); A rubber was dissolved in toluene and re-precipitated from methanol, and this procedure was repeated twice to purify the rubber, which was then dried in vacuum and analyzed by $^1$H-NMR with 270 MHz.

(f) Epoxy group-containing monomer content (% by weight); A rubber was dissolved in toluene and re-precipitated from methanol, and this procedure was repeated twice to purify the rubber, which was then titrated in accordance with Jay method [R. R. Jay; Anal. Chem., 36, 667 (1964)].

(g) Alkoxysilyl group-containing monomer content (% by weight); A rubber was dissolved in toluene and re-precipitated from methanol, and this procedure was repeated twice to purify the rubber, which was then dried in vacuum and analyzed by $^1$H-NMR with 270 MHz.

(h) Weight-average molecular weight of conjugated diene/aromatic vinyl copolymeric rubber; A GPC was employed and represented as a standard polystyrene.

TABLE 2

| Conjugated dieane/aromatic vinyl copolymeric rubber | 1 | 2 | 3 | 4 | 5 | 6 | 7 | 8 |
|---|---|---|---|---|---|---|---|---|
| Raw material | | | | | | | | |
| Butadiene | 58 | 57 | 56 | 53 | 57 | 57.5 | 57.5 | 57.5 |
| Styrene | 42 | 42 | 42 | 42 | 42 | 42 | 42 | 42 |
| Methacrylic acid | | | 1 | | | | | |
| Diethylaminoethyl methacrylate | | | | 2 | | | | |
| Vinylbenzylmethylamine | | | | | 5 | | | |
| 4-Vinylpyridine | | | | | | 1 | | |
| 2-Hydroxyethylmethacrylate | | | | | | 0.5 | | |
| Glycidyl methacrylate | | | | | | | 0.5 | |
| γ-Methacryloxypropyl triisopropoxysilane | | | | | | | | 0.5 |
| Content | | | | | | | | |
| Styrene | 35.1 | 34.5 | 34.2 | 34.2 | 35.2 | 35.0 | 35.1 | 35.0 |
| Methacrylic acid | | | 0.8 | | | | | |
| Diethylaminoethyl methacrylate | | | | 1.9 | | | | |
| Vinylbenzylmethylamine | | | | | 4.7 | | | |
| 4-Vinylpyridine | | | | | | 0.7 | | |
| 2-Hydroxyethylmethacrylate | | | | | | 0.4 | | |
| Glycidyl methacrylate | | | | | | | 0.4 | |
| γ-Methacryloxypropyl triisopropoxysilane | | | | | | | | 0.4 |
| Butadiene unit 1.2-Vinyl content (%) | 17.2 | 17.5 | 17.0 | 17.1 | 17.3 | 17.6 | 17.0 | 17.5 |
| 1.4-Trans content (%) | 66.0 | 66.1 | 65.5 | 64.3 | 64.7 | 65.7 | 63.8 | 66.6 |
| Weight-average molecular weight (×10$^4$) | 67 | 71 | 69 | 69 | 63 | 70 | 65 | 67 |

The results are included in Table 2.

(3) Wet Mixing of Crosslinked Rubber Particle and Conjugated Diene/Aromatic Vinyl Copolymeric Rubber An emulsion containing a crosslinked rubber particle and an emulsion containing a conjugated diene/aromatic vinyl copolymeric rubber were mixed in a solid ratio shown in Table 3. Subsequently, 37.5 parts of an aroma oil was added to 100 parts of the crosslinked rubber particle and the conjugated diene/aromatic vinyl copolymeric rubber contained in the mixed emulsion, which was then coagulated using sulfuric acid and a salt to form a crumb, which was then dried using a hot blast drier to obtain each of the wet mixing rubbers 1 to 3 having the ratios shown in Table 3. This wet mixing process allows the crosslinked rubber particle and the conjugated diene/aromatic vinyl copolymeric rubber to be mixed more uniformly when compared with a dry mixing process.

TABLE 3

| Wet mixing rubber from crosslinked rubber particle and conjugated diene/aromatic vinyl copolymeric rubber | | 1 | 2 | 3 |
|---|---|---|---|---|
| Crosslinked rubber particle | 1 | 10 | 10 | 10 |
| Conjugated diene/ | 1 | 90 | | |
| aromatic vinyl copolymeric rubber | 3 | | 90 | |
| | 6 | | | 90 |

(4) Production of Rubber Composition and Vulcanized Rubber

A crosslinked rubber particle shown in Table 1 and a conjugated diene/aromatic vinyl copolymeric rubber in Table 2 were employed in a formulation shown in Tables 4 to 5 and Table 8 and kneaded using a LABOPLASTMILL (TOYOSEKI Co., Ltd.) to obtain each of the rubber compositions of Examples 1 to 12 and Examples 16 to 19 in Tables 4 to 5 and Table 8. Subsequently, each composition was vulcanized using a vulcanization press at 160° C. for 20 minutes to obtain a vulcanized rubber. Also a wet mixing rubber shown in Table 3 was used to obtain each of the rubber compositions of Examples 13 to 15 shown in Table 6, which were vulcanized similarly. Furthermore, a conjugated diene/aromatic vinyl copolymeric rubber was used alone without any crosslinked rubber particle to obtain each of the rubber compositions of Comparatives 1 to 4 shown in Table 7 and Comparatives 5 to 6 shown in Table 8 which was then vulcanized similarly.

The components incorporated in the formulations described above were as follows.

① Silica; NIPPON SILICA INDUSTRIAL Co., Ltd., Trade name: "NIPSIL AQ"
② Carbon black; MITSUBISHI CHEMICAL Co., Ltd., Trade name: "DIABLACK N220"
③ Silane coupling agent; DEGUSA HULS, Trade name: "Si69"
④ Anti-aging agent; OUCHISHINKO CHEMICAL INDUSTRIAL CO., LTD., Trade name: "NOCRAC 810NA" ⑤ Vulcanization promoter (a); OUCHISHINKO CHEMICAL INDUSTRIAL CO., LTD., Trade name: "NOCCELER CZ" ⑥ Vulcanization promoter (b); OUCHISHINKO CHEMICAL INDUSTRIAL CO., LTD., Trade name: "NOCCELER D"

Each of the rubber compositions and the vulcanized rubbers shown in Tables 4 to 7 was examined for its physical characteristics by the methods shown below.

(A) Processability; A rubber composition was evaluated based on its winding around a roll upon kneaded using the roll. The evaluation criteria are shown below.
⊚:Excellent with no separation form roll surface. ○: Satisfactory with slight separation. Δ:Poor winding with frequent separation. ×: Extremely poor with almost no winding.

(B) Shrinkage of unvulcanized rubber sheet; Evaluation was based on the degree of the shrinkage of an unvalcanized rubber sheet after kneading a rubber composition by a roll and also based on the surface condition when assessed visually. The evaluation criteria are shown below. ⊚: Excellent with extremely low shrinkage and smooth and glossy surface of unvalucanized rubber sheet. ○: Satisfactory with slight shrinkage and smooth surface of unvalucanized rubber sheet. Δ: Poor with shrinkage. ×: Extremely poor with extremely high shrinkage and crack in edge of unvulcanized rubber sheet.

(C) Tensile characteristics: In accordance with JIS K 6301 using a type 3 test piece, the elongation at break (%) and the tensile strength (MPa) were determined at 25° C. and the tensile speed of 500 mm/min.

(D) Wearing resistance; An AKRON wearing tester was employed for the determination in accordance with JIS K 6264. The results were represented as one of the integers from 0 (extensive wearing) to 5 (extremely low wearing).

The results of the evaluation are included in Tables 4 to 7.

TABLE 4

| | | Example | | | | | |
|---|---|---|---|---|---|---|---|
| | | 1 | 2 | 3 | 4 | 5 | 6 |
| Rubber component | | | | | | | |
| Crosslinked rubber particle | 1 | 10 | | | | 10 | 10 |
| | 2 | | 10 | | | | |
| | 3 | | | 10 | | | |
| | 4 | | | | 10 | | |
| Conjugated diene/aromatic | 1 | 90 | 90 | 90 | 90 | | |
| vinyl copolymeric rubber | 2 | | | | | 90 | |
| | 3 | | | | | | 90 |
| aroma oil | | 37.5 | 37.5 | 37.5 | 37.5 | 37.5 | 37.5 |
| Silica | | 60 | 60 | 60 | 60 | 60 | 60 |
| Carbon black | | 10 | 10 | 10 | 10 | 10 | 10 |
| Silane coupling agent | | 3 | 3 | 3 | 3 | 3 | 3 |
| Zinc oxide | | 3 | 3 | 3 | 3 | 3 | 3 |
| Stearic acid | | 2 | 2 | 2 | 2 | 2 | 2 |
| Anti-aging agent | | 1 | 1 | 1 | 1 | 1 | 1 |
| Sulfur | | 2.2 | 2.2 | 2.2 | 2.2 | 2.2 | 2.2 |
| Vulcanization promoter | (a) | 1.5 | 1.5 | 1.5 | 1.5 | 1.5 | 1.5 |

TABLE 4-continued

|  |  | Example | | | | | |
|---|---|---|---|---|---|---|---|
|  |  | 1 | 2 | 3 | 4 | 5 | 6 |
| Processability | (b) | 1 ⊚ | 1 ⊚ | 1 ⊚ | 1 ⊚ | 1 ⊚ | 1 ⊚ |
| Shrinkage of unvulcanized rubber sheet |  | ⊚ | ⊚ | ⊚ | ⊚ | ⊚ | ⊚ |
| Elongation (%) |  | 380 | 370 | 390 | 380 | 360 | 400 |
| Tensile strength (MPa) |  | 21 | 19 | 21 | 22 | 23 | 21 |
| Wearing resistance |  | 4 | 5 | 5 | 5 | 5 | 5 |

TABLE 5

|  |  |  | Example | | | | | |
|---|---|---|---|---|---|---|---|---|
|  |  |  | 7 | 8 | 9 | 10 | 11 | 12 |
| Rubber component |  |  |  |  |  |  |  |  |
| Crosslinked rubber particle |  | 1 |  | 10 |  | 10 | 10 | 10 |
|  |  | 2 | 10 |  |  |  |  |  |
|  |  | 4 |  |  | 10 |  |  |  |
| Conjugated diene/aromatic |  | 3 | 90 |  |  |  |  |  |
| vinyl copolymeric rubber |  | 4 |  | 90 |  |  |  |  |
|  |  | 5 |  |  | 90 |  |  |  |
|  |  | 6 |  |  |  | 90 |  |  |
|  |  | 7 |  |  |  |  | 90 |  |
|  |  | 8 |  |  |  |  |  | 90 |
| aroma oil |  |  | 37.5 | 37.5 | 37.5 | 37.5 | 37.5 | 37.5 |
| Silica |  |  | 60 | 60 | 60 | 60 | 60 | 60 |
| Carbon black |  |  | 10 | 10 | 10 | 10 | 10 | 10 |
| Silane coupling agent |  |  | 3 | 3 | 3 | 3 | 3 | 3 |
| Zinc oxide |  |  | 3 | 3 | 3 | 3 | 3 | 3 |
| Stearic acid |  |  | 2 | 2 | 2 | 2 | 2 | 2 |
| Anti-aging agent |  |  | 1 | 1 | 1 | 1 | 1 | 1 |
| Sulfur |  |  | 2.2 | 2.2 | 2.2 | 2.2 | 2.2 | 2.2 |
| Vulcanization promoter |  | (a) | 1.5 | 1.5 | 1.5 | 1.5 | 1.5 | 1.5 |
|  |  | (b) | 1 | 1 | 1 | 1 | 1 | 1 |
| Processability |  |  | ⊚ | ⊚ | ⊚ | ⊚ | ⊚ | ⊚ |
| Shrinkage of unvulcanized rubber sheet |  |  | ⊚ | ⊚ | ⊚ | ⊚ | ○ | ○ |
| Elongation (%) |  |  | 390 | 370 | 380 | 370 | 350 | 350 |
| Tensile strength (MPa) |  |  | 20 | 21 | 22 | 25 | 23 | 22 |
| Wearing resistance |  |  | 5 | 5 | 5 | 5 | 5 | 5 |

TABLE 6

|  |  | Example | | |
|---|---|---|---|---|
|  |  | 13 | 14 | 15 |
| Rubber component |  |  |  |  |
| Wet mixing rubber | 1 | 100 |  |  |
|  | 2 |  | 100 |  |
|  | 3 |  |  | 100 |
| aroma oil |  | 37.5 | 37.5 | 37.5 |
| Silica |  | 60 | 60 | 60 |
| Carbon black |  | 10 | 10 | 10 |
| Silane coupling agent |  | 3 | 3 | 3 |
| Zinc oxide |  | 3 | 3 | 3 |
| Stearic acid |  | 2 | 2 | 2 |
| Anti-aging agent |  | 1 | 1 | 1 |
| Sulfur |  | 2.2 | 2.2 | 2.2 |
| Vulcanization promoter | (a) | 1.5 | 1.5 | 1.5 |
|  | (b) | 1 | 1 | 1 |
| Processability |  | ⊚ | ⊚ | ⊚ |
| Shrinkage of unvulcanized rubber sheet |  | ⊚ | ⊚ | ⊚ |
| Elongation (%) |  | 400 | 400 | 390 |
| Tensile strength (MPa) |  | 22 | 21 | 25 |
| Wearing resistance |  | 5 | 5 | 5 |

TABLE 7

|  |  | Comparative example | | | |
|---|---|---|---|---|---|
|  |  | 1 | 2 | 3 | 4 |
| Rubber component |  |  |  |  |  |
| Conjugated diene/aromatic | 1 | 100 | 100 |  |  |
| vinyl copolymeric rubber | 3 |  |  | 100 |  |
|  | 6 |  |  |  | 100 |
| aroma oil |  | 37.5 | 37.5 | 37.5 | 37.5 |
| Silica |  | 60 | 60 | 60 | 60 |
| Carbon black |  | 10 | 10 | 10 | 10 |
| Silane coupling agent |  | 6 | 3 | 3 | 6 |
| Zinc oxide |  | 3 | 3 | 3 | 3 |
| Stearic acid |  | 2 | 2 | 2 | 2 |
| Anti-aging agent |  | 1 | 1 | 1 | 1 |
| Sulfur |  | 1.5 | 2.2 | 2.2 | 1.5 |
| Vulcanization promoter | (a) | 1.5 | 1.5 | 1.5 | 1.5 |
|  | (b) | 1 | 1 | 1 | 1 |
| Processability |  | ○ | x | x | Δ |
| Shrinkage of unvulcanized rubber sheet |  | x | x | x | x |
| Elongation (%) |  | 380 | 390 | 370 | 380 |
| Tensile strength (MPa) |  | 21 | 21 | 20 | 22 |
| Wearing resistance |  | 4 | 3 | 4 | 5 |

TABLE 8

|  |  | Example | | | | Comparative example | |
|---|---|---|---|---|---|---|---|
|  |  | 16 | 17 | 18 | 19 | 5 | 6 |
| Rubber component |  |  |  |  |  |  |  |
| Crosslinked rubber particle | 1 | 10 |  | 10 |  |  |  |
|  | 4 |  | 10 |  | 10 |  |  |
| Conjugated diene/aromatic vinyl copolymeric rubber | 1 | 90 | 90 |  |  | 100 |  |
|  | 3 |  |  | 90 |  |  |  |
|  | 5 |  |  |  | 90 |  | 100 |
| aroma oil |  | 37.5 | 37.5 | 37.5 | 37.5 | 37.5 | 37.5 |
| Carbon black |  | 70 | 70 | 70 | 70 | 70 | 70 |
| Zinc oxide |  | 3 | 3 | 3 | 3 | 3 | 3 |
| Stearic acid |  | 2 | 2 | 2 | 2 | 2 | 2 |
| Anti-aging agent |  | 1 | 1 | 1 | 1 | 1 | 1 |
| Sulfur |  | 1.5 | 1.5 | 1.5 | 1.5 | 1.5 | 1.5 |
| Vulcanization promoter | (a) | 1.2 | 1.2 | 1.2 | 1.2 | 1.2 | 1.2 |
|  | (b) | 0.5 | 0.5 | 0.5 | 0.5 | 0.5 | 0.5 |
| Processability |  | ⊚ | ⊚ | ⊚ | ⊚ | ⊚ | ○ |
| Shrinkage of unvulcanized rubber sheet |  | ⊚ | ⊚ | ⊚ | ⊚ | Δ | Δ |
| Elongation (%) |  | 420 | 400 | 390 | 370 | 410 | 400 |
| Tensile strength (MPa) |  | 20 | 22 | 21 | 23 | 20 | 22 |
| Wearing resistance |  | 5 | 5 | 5 | 5 | 4 | 5 |

Based on the results shown in Tables 4 to 6, and Table 8, each of the rubber compositions of Examples 1 to 15 and Examples 16 to 19 exhibited excellent processability and dimension stability, and gave a vulcanized rubber having excellent tensile strength and wearing resistance. On the other hand, the results shown in Table 7 revealed that while the rubber composition of Comparative 1 had a satisfactory processability due to a large amount of a silane coupling agent it gave a vulcanized rubber having poor physical characteristics and that each of Comparatives 3 and 4 showed satisfactory physical characteristics but the processability was poor. In Comparative 2, the processability and the physical characteristics were both poor. The results shown in Table 8 revealed the poorness of Comparatives 5 and 6 in both of the processability and the dimension stability, especially in the dimension stability. As described above, each rubber composition of Comparatives 1 to 6 was not successful in achieving excellent processability and physical characteristics all at the same time, indicating a difficulty in producing a industrially useful vulcanized rubber consistently.

What is claimed is:

1. A rubber composition, comprising:
   (1) a crosslinked rubber particle containing as repeating units
       (a) 39.89 to 79.89% by weight of a conjugated diene unit,
       (b) 20 to 60% by weight of an aromatic vinyl unit,
       (c) 0.01 to 10% by weight of a monomer unit having at least two polymerizable unsaturated groups, and
       (d) 0.1 to 30% by weight of a monomer unit having one polymerizable unsaturated group and an amino group;
       wherein a total amount of (a), (b), (c) and (d) is 100% by weight; and
   (2) a conjugated diene/aromatic vinyl copolymeric rubber whose conjugated diene unit has a 1,2-vinyl content of 10 to 30% and a 1,4-trans content exceeding 55%.

2. The rubber composition according to claim 1, further comprising at least one member selected from the group consisting of a silica and a carbon black.

3. The rubber composition according to claim 2, wherein a total amount of said silica and said carbon black, when said silica and said carbon black are employed in combination, is 10 to 120 parts by weight based on 100 parts by weight of a total amount of said crosslinked rubber particle and said conjugated diene/aromatic vinyl copolymeric rubber.

4. A rubber composition, comprising:
   (1) a crosslinked rubber particle containing as repeating units
       (a) 39.89 to 79.89% by weight of a conjugated diene unit,
       (b) 20 to 60% by weight of an aromatic vinyl unit,
       (c) 0.01 to 10% by weight of a monomer unit having at least two polymerizable unsaturated groups, and
       (d) 0.1 to 30% by weight of a monomer unit having one polymerizable unsaturated group and an amino group;
       wherein a total amount of (a), (b), (c) and (d) is 100% by weight; and
   (2) a conjugated diene/aromatic vinyl copolymeric rubber whose conjugated diene unit has a 1,2-vinyl content of 10 to 30% and a 1,4-trans content exceeding 55%;

wherein said conjugated diene forming said conjugated diene unit (a) and said conjugated diene forming said conjugated diene unit of said conjugated diene/ aromatic vinyl copolymeric rubber are each at least one member selected from the group consisting of 1,3-butadiene, 2,3-dimethyl-1,3-butadiene, isoprene and chloroprene;

wherein said aromatic vinyl forming said aromatic vinyl unit (b) and said aromatic vinyl forming said aromatic vinyl unit of said conjugated diene/aromatic vinyl copolymeric rubber are each at least one member selected from the group consisting of styrene, 2-methylstyrene, 3-methylstyrene, 4-methylstyrene, α-methylstyrene, 2,4-dimethylstyrene, 2,4-diisopropylstyrene, 4-tert-butylstyrene and tert-butoxystyrene;

wherein said monomer forming said monomer unit (c) having at least two polymerizable unsaturated groups is at least one member selected from the group consisting of ethylene glycol di(meth)acrylate, propylene glycol di(meth)acrylate, 1,4-butanediol di(meth)acrylate, 1,6- hexanediol di(meth)acrylate, trimethylolpropane di(meth)acrylate, trimethylolpropane tri(meth)acrylate, pentaerythritol tri(meth)acrylate, pentaerythritol tetra (meth)acrylate, divinylbenzene, diisopropenylbenzene and trivinylbenzene; and wherein said monomer forming said monomer unit (d) having one polymerizable unsaturated group and an amino group is at least one member selected from the group consisting of dialkylaminoalkyl(meth)acrylates, N-dialkylaminoalkyl group-containing unsaturated amides and tertiary amino group-containing vinyl aromatic compounds;

wherein at least a part of said conjugated diene/aromatic vinyl copolymeric rubber comprises 0.1 to 30% by weight of a monomer unit having one polymerizable unsaturated group and at least one functional group selected from the group consisting of a carboxylic group, an amino group, a hydroxyl group, an epoxy group and an alkoxysilyl group; wherein said carboxylic group is $CO_2H$, $CO_2^-$ or a mixture thereof;

wherein said monomer forming said monomer unit having one polymerizable unsaturated group and a carboxylic group is at least one member selected from the group consisting of (meth)acrylic acid, maleic acid, fumaric acid, itaconic acid, tetraconic acid, cinnamic acid; a monoester of phthalic acid with a hydroxyl (meth)allyl alcohol, a monoester of succinic acid with a hydroxyl (meth)allyl alcohol, a monoester of adipic acid with a hydroxyl (meth)allyl alcohol and 2-hydroxyethyl (meth)acrylate, as well as their salts; wherein said carboxylic group is $CO_2H$, $CO_2^-$ or a mixture thereof.

5. A rubber composition, comprising:
(1) a crosslinked rubber particle containing as repeating units
   (a) 39.89 to 79.89% by weight of a conjugated diene unit,
   (b) 20 to 60% by weight of an aromatic vinyl unit,
   (c) 0.01 to 10% by weight of a monomer unit having at least two polymerizable unsaturated groups, and
   (d) 0.1 to 30% by weight of a monomer unit having one polymerizable unsaturated group and an amino group;
   wherein a total amount of (a), (b), (c) and (d) is 100% by weight; and
(2) a conjugated diene/aromatic vinyl copolymeric rubber whose conjugated diene unit has a 1,2-vinyl content of 10 to 30% and a 1,4-trans content exceeding 55%;
(3) at least one member selected from the group consisting of a silica and a carbon black;

wherein said conjugated diene forming said conjugated diene unit (a) and said conjugated diene forming said conjugated diene unit of said conjugated diene/aromatic vinyl copolymeric rubber are each at least one member selected from the group consisting of 1,3-butadiene, 2,3-dimethyl-1,3-butadiene, isoprene and chloroprene;

wherein said aromatic vinyl forming said aromatic vinyl unit (b) and said aromatic vinyl forming said aromatic vinyl unit of said conjugated diene/aromatic vinyl copolymeric rubber are each at least one member selected from the group consisting of styrene, 2-methylstyrene, 3-methylstyrene, 4-methylstyrene, a-methylstyrene, 2,4-dimethylstyrene, 2,4-diisopropylstyrene, 4-tert-butylstyrene and tert-butoxystyrene;

wherein said monomer forming said monomer unit (c) having at least two polymerizable unsaturated groups is at least one member selected from the group consisting of ethylene glycol di(meth)acrylate, propylene glycol di(meth)acrylate, 1,4-butanediol di(meth)acrylate, 1,6-hexanediol di(meth)acrylate, trimethylolpropane di(meth)acrylate, trimethylolpropane tri(meth)acrylate, pentaerythritol tri(meth)acrylate, pentaerythritol tetra (meth)acrylate, divinylbenzene, diisopropenylbenzene and trivinylbenzene; and wherein said monomer forming said monomer unit (d) having one polymerizable unsaturated group and an amino group is at least one member selected from the group consisting of dialkylaminoalkyl(meth)acrylates, N-dialkylaminoalkyl group-containing unsaturated amides and tertiary amino group-containing vinyl aromatic compounds;

wherein said crosslinked rubber particle additionally contains another polymerizable unsaturated monomer unit;

wherein a monomer forming said polymerizable unsaturated monomer unit is at least one member selected from the group consisting of (meth)acrylonitrile, vinylidene cyanide, vinyl chloride, vinylidene chloride, (meth) acrylamide, maleimide, methyl (meth)acrylate, ethyl (meth)acrylate, n-propyl (meth)acrylate, iso-propyl (meth)acrylate, n-butyl (meth)acrylate, iso-butyl (meth)acrylate, sec-butyl (meth)acrylate, tert-butyl (meth)acrylate, n-amyl (meth)acrylate, n-hexyl (meth) acrylate, 2-ethylhexyl (meth)acrylate and cyclohexyl (meth)acrylate.

6. The rubber composition according to claim 5, wherein a total amount of said silica and said carbon black, when said silica and said carbon black are employed in combination, is 10 to 120 parts by weight, based on 100 parts by weight of a total amount of said crosslinked rubber particle and said conjugated diene/aromatic vinyl copolymeric rubber.

7. A rubber composition, comprising:
(1) a crosslinked rubber particle containing as repeating units
   (a) 39.89 to 79.89% by weight of a conjugated diene unit,
   (b) 20 to 60% by weight of an aromatic vinyl unit,
   (c) 0.01 to 10% by weight of a monomer unit having at least two polymerizable unsaturated groups, and
   (d) 0.1 to 30% by weight of a monomer unit having one polymerizable unsaturated group and an amino group;
   wherein a total amount of (a), (b), (c) and (d) is 100% by weight; and
(2) a conjugated diene/aromatic vinyl copolymeric rubber whose conjugated diene unit has a 1,2-vinyl content of 10 to 30% and a 1,4-trans content exceeding 55%;

wherein said conjugated diene forming said conjugated diene unit (a) and said conjugated diene forming said conjugated diene unit of said conjugated diene/aromatic vinyl copolymeric rubber are each at least one member selected from the group consisting of 1,3-butadiene, 2,3-dimethyl-1,3-butadiene, isoprene and chloroprene;

wherein said aromatic vinyl forming said aromatic vinyl unit (b) and said aromatic vinyl forming said aromatic vinyl unit of said conjugated diene/aromatic vinyl copolymeric rubber are each at least one member selected from the group consisting of styrene, 2-methylstyrene, 3-methylstyrene, 4-methylstyrene, α-methylstyrene, 2,4-dimethylstyrene, 2,4-diisopropylstyrene, 4-tert-butylstyrene and tert-butoxystyrene;

wherein said monomer forming said monomer unit (c) having at least two polymerizable unsaturated groups is at least one member selected from the group consisting of ethylene glycol di(meth)acrylate, propylene glycol di(meth)acrylate, 1,4-butanediol di(meth)acrylate, 1,6-hexanediol di(meth)acrylate, trimethylolpropane di(meth)acrylate, trimethylolpropane tri(meth)acrylate, pentaerythritol tri(meth)acrylate, pentaerythritol tetra (meth)acrylate, divinylbenzene, diisopropenylbenzene and trivinylbenzene; and, wherein said monomer forming said monomer unit (d) having one polymerizable unsaturated group and an amino group is at least one member selected from the group consisting of dialkylaminoalkyl(meth)acrylates, N-dialkylaminoalkyl group-containing unsaturated amides and tertiary amino group-containing vinyl aromatic compounds;

wherein said crosslinked rubber particle additionally contains another polymerizable unsaturated monomer unit;

wherein a monomer forming said polymerizable unsaturated monomer unit is at least one member selected from the group consisting of (meth)acrylonitrile, vinylidene cyanide, vinyl chloride, vinylidene chloride, (meth)acrylamide, maleimide, methyl (meth)acrylate, ethyl (meth)acrylate, n-propyl (meth)acrylate, iso-propyl (meth)acrylate, n-butyl (meth)acrylate, iso-butyl (meth)acrylate, sec-butyl (meth)acrylate, tert-butyl (meth)acrylate, n-amyl (meth)acrylate, n-hexyl (meth)acrylate, 2-ethylhexyl (meth)acrylate and cyclohexyl (meth)acrylate;

wherein at least a part of said conjugated diene/aromatic vinyl copolymeric rubber comprises 0.1 to 30% by weight of a monomer unit having one polymerizable unsaturated group and at least one functional group selected from the group consisting of a carboxylic group, an amino group, a hydroxyl group, an epoxy group and an alkoxysilyl group;

wherein said carboxylic group is $CO_2H$, $CO_2^-$ or a mixture thereof wherein said monomer forming said monomer unit having one polymerizable unsaturated group and a carboxylic group is at least one member selected from the group consisting of (meth)acrylic acid, maleic acid, fumaric acid, itaconic acid, tetraconic acid, cinnamic acid; a monoester of phthalic acid with a hydroxyl (meth)allyl alcohol, a monoester of succinic acid with a hydroxyl (meth)allyl alcohol, a monoester of adipic acid with a hydroxyl (meth)allyl alcohol and 2-hydroxyethyl (meth)acrylate, as well as their salts; wherein said carboxylic group is $CO_2H$, $CO_2^-$ or a mixture thereof;

wherein said monomer forming said monomer unit having one polymerizable unsaturated group and an amino group is at least one member selected from the group consisting of dimethylaminomethyl (meth)acrylate, diethylaminomethyl (meth)acrylate, 2-dimethylaminoethyl (meth)acrylate, 2-diethylaminoethyl (meth)acrylate, 2-(dipropylamino)ethyl (meth)acrylate, 2-dimethylaminopropyl (meth)acrylate, 2-diethylaminopropyl (meth)acrylate, 2-(di-n-propylamino)propyl (meth)acrylate, 3-dimethylaminopropyl(meth)acrylate, 3-diethylaminopropyl (meth)acrylate, 3-(dipropylamino)propyl (meth)acrylate, and N-dimethylaminomethyl (meth)acrylamide, N-diethylaminomethyl (meth)acrylamide, N-(2-dimethylaminoethyl) (meth)acrylamide, N-(2-diethylaminoethyl) (meth)acrylamide, N-(2-diethylaminopropyl) (meth)acrylamide, N-(3-dimethylaminopropyl) (meth)acrylamide, N-(3-diethylaminopropyl) (meth)acrylamide, and N,N-dimethyl-p-aminostyrene, N,N-diethyl-p-aminostyrene, dimethyl(p-vinylbenzyl)amine, diethyl (p-vinylbenzyl)amine, dimethyl(p-vinylphenethyl) amine, diethyl(p-vinylphenethyl)amine, dimethyl(p-vinylbenzyloxymethyl)amine, dimethyl[2-(p-vinylbenzyloxy)ethyl]amine, diethyl(p-vinylbenzyloxymethyl)amine, diethyl[2-(p-vinylbenzyloxy)ethyl]amine, dimethyl(p-vinylphenethyloxymethyl)amine, dimethyl[2-(p-vinylphenethyloxy)ethyl]amine, diethyl(p-vinylphenethyloxymethyl)amine, diethyl[2-(p-vinylphenethyloxy)ethyl]amine, 2-vinylpyridine, 3-vinylpyridine and 4-vinylpyridine;

wherein said monomer forming said monomer unit having one polymerizable unsaturated group and a hydroxyl group is at least one member selected from the group consisting of 2-hydroxyethyl (meth)acrylates, 2-hydroxypropyl (meth)acrylates, 3-hydroxypropyl (meth)acrylates, 2-hydroxybutyl (meth)acrylates, 3-hydroxybutyl (meth)acrylates and 4-hydroxybutyl (meth)acrylates, mono (meth)acrylates of apolyethylene glycol having a number of ethylene glycol units of 2 to 23, mono (meth)acrylates of polypropylene glycol having a number of propylene glycol units of 2 to 23, N-hydroxymethyl (meth)acrylamide, N-(2-hydroxyethyl) (meth)acrylamide, N,N-bis(2-hydroxyethyl) (meth) acrylamide, o-hydroxystyrene, m-hydroxystyrene, p-hydroxystyrene, o-hydroxy-α-methylstyrene, m-hydroxy-α-methylstyrene, p-hydroxy-α-methylstyrene p-vinylbenzyl alcohol, and (meth)allyl alcohol;

wherein said monomer forming said monomer unit having one polymerizable unsaturated group and an epoxy group is at least one member selected from the group consisting of (meth)allylglycidylether, glycidyl (meth)acrylate, and 3,4-oxycyclohexyl (meth)acrylate; and wherein said monomer forming said monomer unit having one polymerizable unsaturated group and an alkoxysilyl group is at least one member selected from the group consisting of (meth)acryloxymethyl trimethoxysilane, (meth)acryloxymethyl methyldimethoxysilane, (meth)acryloxymethyl dimethylmethoxysilane, (meth)acryloxymethyl triethoxysilane, (meth)acryloxymethyl methyldiethoxysilane, (meth)acryloxymethyl dimethylethoxysilane, (meth)acryloxymethyl tripropoxysilane, (meth)acryloxymethyl methyldipropoxysilane, (meth)acryloxymethyl dimethylpropoxysilane, γ-(meth)acryloxypropyl trimethoxysilane, γ-(meth)acryloxypropyl methyldimethoxysilane, γ-(meth)acryloxypropyl dimethylmethoxysilane, γ-(meth)acryloxypropyl triethoxysilane, γ-(meth)acryloxypropyl methyldiethoxysilane, γ-(meth)acryloxypropyl dimethylethoxysilane, γ-(meth)acryloxypropyl tripropoxysilane, γ-(meth)acryloxypropyl methyldipropoxysilane, γ-(meth)acryloxypropyl dimethylpropoxysilane, γ-(meth)acryloxypropyl methyldiphenoxysilane, γ-(meth)acryloxypropyl dimethylphenoxysilane, γ-(meth)acryloxypropyl methyldibenzyloxysilane, and γ-(meth)acryloxypropyl dimethylphenoxysilane.

8. The rubber composition according to claim 4, further comprising at least one member selected from the group consisting of a silica and a carbon black.

9. The rubber composition according to claim 8, wherein a total amount of said silica and said carbon black, when said silica and said carbon black are employed in combination, is 10 to 120 parts by weight based on 100 parts by weight of a total amount of said crosslinked rubber particle and said conjugated diene/aromatic vinyl copolymeric rubber.

10. The rubber composition according to claim 7, further comprising at least one member selected from the group consisting of a silica and a carbon black.

11. The rubber composition according to claim 10, wherein a total amount of said silica and said carbon black, when said silica and said carbon black are employed in combination, is 10 to 120 parts by weight based on 100 parts by weight of a total amount of said crosslinked rubber particle and said conjugated diene/aromatic vinyl copolymeric rubber.

12. A rubber composition, comprising:
(1) a crosslinked rubber particle containing as repeating units
   (a) 39.89 to 79.89% by weight of a conjugated diene unit,
   (b) 20 to 60% by weight of an aromatic vinyl unit,
   (c) 0.01 to 10% by weight of a monomer unit having at least two polymerizable unsaturated groups, and
   (d) 0.1 to 30% by weight of a monomer unit having one polymerizable unsaturated group and an amino group;
   wherein a total amount of (a), (b), (c) and (d) is 100% by weight; and
(2) a conjugated diene/aromatic vinyl copolymeric rubber whose conjugated diene unit has a 1,2-vinyl content of 10 to 30% and a 1,4-trans content exceeding 55%;
wherein said conjugated diene forming said conjugated diene unit (a) and said conjugated diene forming said conjugated diene unit of said conjugated diene/aromatic vinyl copolymeric rubber are each at least one member selected from the group consisting of 1,3-butadiene, 2,3-dimethyl-1,3-butadiene, isoprene and chloroprene;
wherein said aromatic vinyl forming said aromatic vinyl unit (b) and said aromatic vinyl forming said aromatic vinyl unit of said conjugated diene/aromatic vinyl copolymeric rubber are each at least one member selected from the group consisting of styrene, 2-methylstyrene, 3-methylstyrene, 4-methylstyrene, α-methylstyrene, 2,4-dimethylstyrene, 2,4-diisopropylstyrene, 4-tert-butylstyrene and tert-butoxystyrene;
wherein said monomer forming said monomer unit (c) having at least two polymerizable unsaturated groups is at least one member selected from the group consisting of ethylene glycol di(meth)acrylate, propylene glycol di(meth)acrylate, 1,4-butanediol di(meth)acrylate, 1,6-hexanediol di(meth)acrylate, trimethylolpropane di(meth)acrylate, trimethylolpropane tri(meth)acrylate, pentaerythritol tri(meth)acrylate, pentaerythritol tetra (meth)acrylate, divinylbenzene, diisopropenylbenzene and trivinylbenzene; and,
wherein said monomer forming said monomer unit (d) having one polymerizable unsaturated group and an amino group is at least one member selected from the group consisting of dialkylaminoalkyl(meth)acrylates, N-dialkylaminoalkyl group-containing unsaturated amides and tertiary amino group-containing vinyl aromatic compounds;
wherein at least a part of said conjugated diene/aromatic vinyl copolymeric rubber comprises 0.1 to 30% by weight of a monomer unit having one polymerizable unsaturated group and at least one functional group selected from the group consisting of a carboxylic group, an amino group, a hydroxyl group, an epoxy group and an alkoxysilyl group; wherein said carboxylic group is $CO_2H$, $CO_2^-$ or a mixture thereof;
wherein said monomer forming said monomer unit having one polymerizable unsaturated group and an amino group is at least one member selected from the group consisting of dimethylaminomethyl (meth)acrylate, diethylaminomethyl (meth)acrylate, 2-dimethylaminoethyl (meth)acrylate, 2-diethylaminoethyl (meth)acrylate, 2-(di-propylamino)ethyl (meth)acrylate, 2-dimethylaminopropyl (meth)acrylate, 2-diethylaminopropyl (meth)acrylate, 2-(di-n-propylamino)propyl (meth)acrylate, 3-dimethylaminopropyl(meth)acrylate, 3-diethylaminopropyl (meth)acrylate, 3-(di-propylamino)propyl (meth)acrylate, N-dimethylaminomethyl (meth)acrylamide, N-diethylaminomethyl (meth)acrylamide, N-(2-dimethylaminoethyl) (meth)acrylamide, N-(2-diethylaminoethyl) (meth)acrylamide, N-(2-diethylaminopropyl) (meth)acrylamide, N-(3-dimethylaminopropyl) (meth)acrylamide, N-(3-diethylaminopropyl) (meth)acrylamide, N,N-dimethyl-p-aminostyrene, N,N-diethyl-p-aminostyrene, dimethyl(p-vinylbenzyl)amine, diethyl(p-vinylbenzyl)amine, dimethyl(p-vinylphenethyl)amine, diethyl(p-vinylphenethyl)amine, dimethyl(p-vinylbenzyloxymethyl)amine, dimethyl[2-(p-vinylbenzyloxy)ethyl]amine, diethyl(p-vinylbenzyloxymethyl)amine, diethyl[2-(p-vinylbenzyloxy)ethyl]amine, dimethyl(p-vinylphenethyloxymethyl)amine, dimethyl[2-(p-vinylphenethyloxy)ethyl]amine, diethyl(p-vinylphenethyloxymethyl)amine, diethyl[2-(p-vinylphenethyloxy)ethyl]amine, 2-vinylpyridine, 3-vinylpyridine and 4-vinylpyridine;
wherein said monomer forming said monomer unit having one polymerizable unsaturated group and a hydroxyl group is at least one member selected from the group consisting of 2-hydroxyethyl (meth)acrylates, 2-hydroxypropyl (meth)acrylates, 3-hydroxypropyl (meth)acrylates, 2-hydroxybutyl (meth)acrylates, 3-hydroxybutyl (meth)acrylates and 4-hydroxybutyl (meth)acrylates, mono (meth)acrylates of apolyethylene glycol having a number of ethylene glycol units of 2 to 23, mono (meth)acrylates of polypropylene glycol having a number of propylene glycol units of 2 to 23, N-hydroxymethyl (meth)acrylamide, N-(2-hydroxyethyl) (meth)acrylamide, N,N-bis(2-hydroxyethyl) (meth) acrylamide, o-hydroxystyrene, m-hydroxystyrene, p-hydroxystyrene, o-hydroxy-α-methylstyrene, m-hydroxy-α-methylstyrene, p-hydroxy-α-methylstyrene p-vinylbenzyl alcohol, and (meth)allyl alcohol;
wherein said monomer forming said monomer unit having one polymerizable unsaturated group and an epoxy group is at least one member selected from the group consisting of (meth)allylglycidylether, glycidyl (meth) acrylate, and 3,4-oxycyclohexyl (meth)acrylate; and wherein said monomer forming said monomer unit having one polymerizable unsaturated group and an alkoxysilyl group is at least one member selected from the group consisting of (meth)acryloxymethyl trimethoxysilane, (meth)acryloxymethyl methyldimethoxysilane, (meth)acryloxymethyl dimiethylmethoxysilane, (meth)acryloxymethyl triethoxysilane, (meth)acryloxymethyl methyldiethoxysilane, (meth)acryloxymethyl dimethylethoxysilane, (meth)acryloxymethyl tripropoxysilane, (meth)acryloxymethyl methyldipropoxysilane, (meth)acryloxymethyl dimethylpropoxysilane, γ-(meth)acryloxypropyl trimethoxysilane, γ-(meth)acryloxypropyl methyldimethoxysilane, γ-(meth)acryloxypropyl dimethylmethoxysilane, γ-(meth)acryloxypropyl triethoxysilane, γ-(meth)acryloxypropyl methyldiethoxysilane, γ-(meth)acryloxypropyl dimethylethoxysilane, γ-(meth)acryloxypropyl tripropoxysilane, γ-(meth)acryloxypropyl methyldipropoxysilane, γ-(meth)acryloxypropyl dimethylpropoxysilane, γ-(meth)acryloxypropyl methyldiphenoxysilane, γ-(meth)acryloxypropyl dimethylphenoxysilane, γ-(meth)acryloxypropyl methyldibenzyloxysilane, and γ-(meth)acryloxypropyl dimethylphenoxysilane.

13. The rubber composition according to claim 12, further comprising at least one member selected from the group consisting of a silica and a carbon black.

14. The rubber composition according to claim 13, wherein a total amount of said silica and said carbon black, when said silica and said carbon black are employed in combination, is 10 to 120 parts by weight based on 100 parts by weight of a total amount of said crosslinked rubber particle and said conjugated diene/aromatic vinyl copolymeric rubber.

* * * * *